US012591430B2

(12) United States Patent
Burr et al.

(10) Patent No.: US 12,591,430 B2
(45) Date of Patent: Mar. 31, 2026

(54) DIGITAL COMPUTE HARDWARE FOR EFFICIENT ELEMENT-WISE AND CROSS-VECTOR MAXIMUM OPERATIONS

(71) Applicant: International Business Machines Corporation, Armonk, NY (US)

(72) Inventors: Geoffrey Burr, Cupertino, CA (US); Shubham Jain, Elmsford, NY (US); Yasuteru Kohda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/204,934

(22) Filed: Jun. 1, 2023

(65) Prior Publication Data

US 2024/0403045 A1     Dec. 5, 2024

(51) Int. Cl.
G06F 9/30        (2018.01)
G06F 9/355       (2018.01)

(52) U.S. Cl.
CPC ...... G06F 9/30036 (2013.01); G06F 9/30021 (2013.01); G06F 9/3555 (2013.01)

(58) Field of Classification Search
CPC . G06F 9/30036; G06F 9/30021; G06F 9/3555
See application file for complete search history.

(56) References Cited

U.S. PATENT DOCUMENTS

| | | | | |
|---|---|---|---|---|
| 10,922,080 | B2 * | 2/2021 | Gogar | G06F 7/544 |
| 10,942,985 | B2 | 3/2021 | Espig | |
| 11,200,186 | B2 | 12/2021 | Fleming, Jr. | |
| 11,210,586 | B1 | 12/2021 | Duong | |
| 2014/0207836 | A1 * | 7/2014 | Mundarath | G06F 7/026 |
| | | | | 708/207 |
| 2018/0088945 | A1 * | 3/2018 | Plotnikov | G06F 9/30021 |
| 2024/0311313 | A1 * | 9/2024 | Anderson | G06F 7/49915 |

OTHER PUBLICATIONS

Castaneda, O. et al.; PPAC: A Versatile In-Memory Accelerator for Matrix-Vector-Product-Like Operations. 2019, pp. 1-8.
IPCOM000171310D; System for Vectorized Hardware Accelerated Functions Wit Automatic Interface Generation. 2008, pp. 1-22.

(Continued)

*Primary Examiner* — Corey S Faherty

(74) *Attorney, Agent, or Firm* — Kimberly Zillig; Otterstedt & Kammer PLLC

(57)            ABSTRACT

A system for efficient element-wise and cross-vector maximum operations. One example system includes an input bus, an output bus, and a memory configured to store N/K elements of an N-element vector in a corresponding row of the memory. A K-wide FMAX( ) comparator has a first set of K-wide inputs of the K-wide FMAX( ) comparator coupled to a read port of the memory and a second set of K-wide inputs of the K-wide FMAX( ) comparator coupled to the input bus, and a set of K-wide outputs of the K-wide FMAX( ) comparator coupled to a write port of the memory. A tree of FMAX( ) comparators comprises an input and an output, the input of the tree coupled to the set of K-wide outputs of the K-wide FMAX( ) comparator and the output of the tree coupled to the output bus.

14 Claims, 6 Drawing Sheets

(56) References Cited

OTHER PUBLICATIONS

IPCOM000180318D; High Performance Implementation of Mathematical Functions Based on Look-Up Tables With Non-Linear Bucket Ranges for the Cell Be Processors With Similar Architecture. 2009, pp. 1-14.

Raja, KVP. et al.; A Architectural Study of Hyper-Dimensional Processor for Human-Centric IOT. 2022, pp. 7-12.

Samardzic, N. et al.; Craterlake: A Hardware Accelerator for Efficient Unbounded Computation on Encrypted Data. 2022, pp. 1-15.

Zhou, M. et al.; DP-SIM: A Full-Stack Simulation Infrastructure for Digital Processing In-Memory Architectures. 2021, pp. 1-6.

Shubham Jain et al. A Heterogeneous and Programmable Compute-In-Memory Accelerator Architecture for Analog-AI Using Dense 2-D Mesh. IEEE Transactions on Very Large Scale Integration (VLSI) Systems, vol. 31, No. 1, Jan. 2023. pp. 14.

Peter Mell and Timothy Grance, The NIST Definition of Cloud Computing, NIST Special Publication 800-145, Sep. 2011, cover, pp. i-iii and 1-3.

* cited by examiner

100

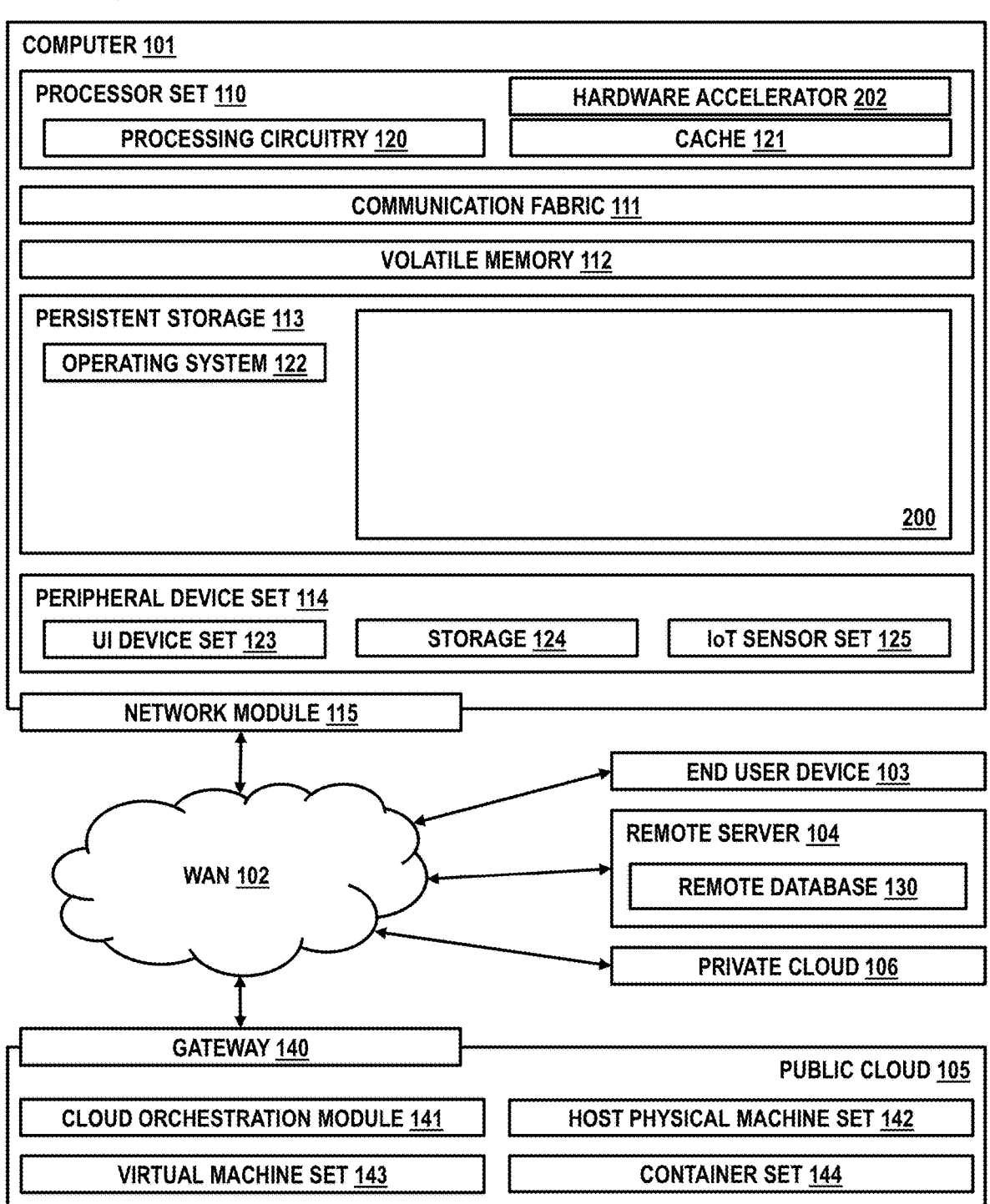

COMPUTER 101

PROCESSOR SET 110

PROCESSING CIRCUITRY 120

HARDWARE ACCELERATOR 202

CACHE 121

COMMUNICATION FABRIC 111

VOLATILE MEMORY 112

PERSISTENT STORAGE 113

OPERATING SYSTEM 122

200

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 4

DIGITAL COMPUTE HARDWARE FOR EFFICIENT ELEMENT-WISE AND CROSS-VECTOR MAXIMUM OPERATIONS

BACKGROUND

The present invention relates generally to the electrical, electronic and computer arts and, more particularly, to digital compute hardware.

A variety of vectorized operations that are performed in neural networks involve a maximum "MAX( )" operation, such as an exponential "EXP( )" operation performed within a softmax operation, are more efficient to perform if the data elements have already had the MAX( ) value across the entire vector subtracted first. (This guarantees that the inputs to the EXP( ) function are zero or negative, which then guarantees that the outputs are bounded between 0.0 and 1.0 and thus avoids potentially very large outputs of the EXP( ) function.) Operations across a mini-batch of examples may call for a vector that represents the element-wise MAX( ) across a mini-batch for each data-value within the example. Unfortunately, MAX( ) operations are inherently troublesome for efficient pipelined processes since all elements of a vector (or of multiple vectors) must be examined and the MAX( ) value fully updated before subsequent computations can proceed.

BRIEF SUMMARY

Principles of the invention provide techniques for digital-compute hardware for efficient element-wise and cross-vector MAX operations. In one aspect, an exemplary system includes an input bus; an output bus; a memory configured to store N/K elements of an N-element vector in a corresponding row of the memory; a K-wide FMAX( ) comparator, a first set of K-wide inputs of the K-wide FMAX( ) comparator coupled to a read port of the memory and a second set of K-wide inputs of the K-wide FMAX( ) comparator coupled to the input bus, and a set of K-wide outputs of the K-wide FMAX( ) comparator coupled to a write port of the memory; and a tree of FMAX( ) comparators, the tree comprising an input and an output, the input of the tree coupled to the set of K-wide outputs of the K-wide FMAX( ) comparator and the output of the tree coupled to the output bus.

In one aspect, a system includes a memory; an interconnection network; a plurality of MAX compute circuits coupled to the interconnection network, each MAX compute circuit assigned a corresponding portion of each of a plurality of arriving vectors, wherein each MAX compute circuit is configured to receive the corresponding portion of each arriving vector as a time-multiplexed set of sequences of elements, store each of the sequence of elements in a row of the memory, perform a parallel MAX( ) operation between a subsequent sequence of elements and a corresponding sequence of elements stored within the memory for a corresponding point in the time-multiplexed set, store a resulting sequence of elements into the memory, and output a final resulting sequence of elements from the memory.

In one aspect, an exemplary system includes an interconnection network; an OUT register comprising an output; a plurality of MAX compute circuits coupled to the interconnection network, each MAX compute circuit assigned a corresponding portion of each of one or more arriving vectors, wherein each MAX compute circuit is configured to receive the corresponding portion of each arriving vector as a time-multiplexed set of sequences of elements, reset the OUT register, perform a parallel MAX( ) operation between a subsequent sequence of elements and the output of the OUT register and store a resulting vector in the OUT register in response to receiving the subsequent sequence of elements, perform MAX( ) operations across elements within the OUT register, and produce a scalar value representing a maximum value across the portion of all arriving vectors associated with the corresponding MAX compute circuit.

As used herein, "facilitating" an action includes performing the action, making the action easier, helping to carry the action out, or causing the action to be performed. Thus, by way of example and not limitation, instructions executing on a processor might facilitate an action carried out by semiconductor fabrication equipment, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

tightly-pipelined compute architectures and hardware systems that provide close coordination with dedicated memory (e.g., static random access memory (SRAM)), and re-use of a small number of compute blocks to provide special-purpose compute hardware which can efficiently perform both element-wise and cross-vector forms of MAX( ) operations in a pipelined fashion; and
    improvements to analog-artificial intelligence (AI) systems and other accelerators requiring energy- and area-efficient implementation of element-wise and cross-vector MAX( ) operations while maintaining floating-point accuracy.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 4 depicts a computing environment according to an embodiment of the present invention (e.g., for implementing a design process such as that of FIG. 5)

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Generally, special-purpose compute architectures and digital-compute hardware that can efficiently and compactly perform both element-wise and cross-vector forms of the MAX( ) operation in a pipelined fashion are disclosed. Conventional alternative solutions involve conventional microprocessor or multi-processor solutions utilizing a conventional memory space and an instruction set architecture. Such a general-purpose solution, however, is significantly less energy-efficient than the disclosed special-purpose, digital-compute hardware.

Figure 1A:
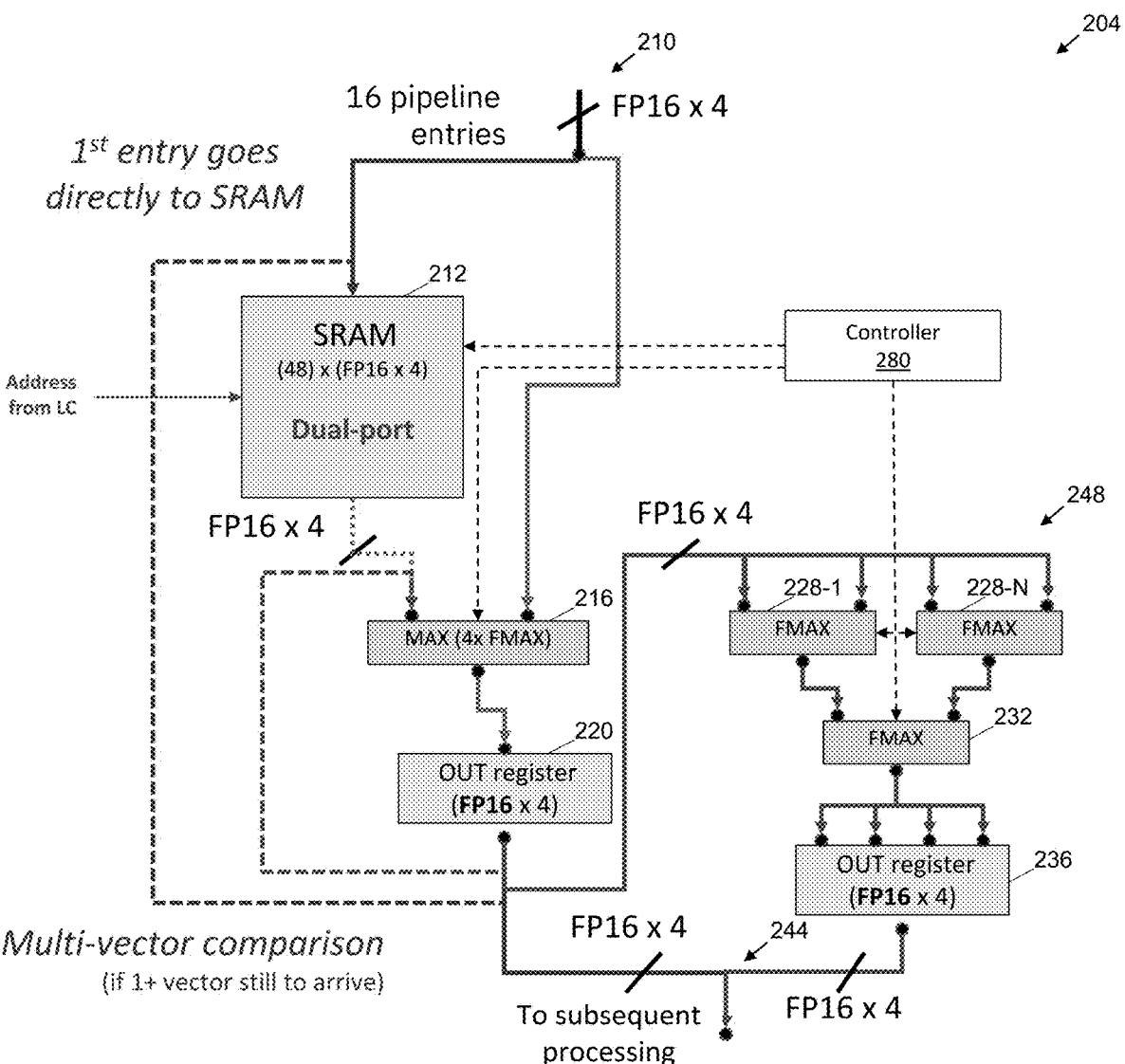
FIG. 1A is a block diagram of a first example embodiment of a MAX compute circuit for performing both element-wise and cross-vector forms of the MAX( ) operation in a pipelined fashion, in accordance with an example embodiment.

FIG. 1A is a block diagram of a first example embodiment of a MAX compute circuit 204 for performing both element-wise and cross-vector forms of the MAX( ) operation in a pipelined fashion, in accordance with an example embodiment. There are at least two use cases for the MAX compute circuit 204, which are described for a particular choice of vector-length (64), time-multiplexing (16-fold), and data-precision (16-bit floating point), without loss of generality to other such choices as would be apparent to one skilled in the art, given the teachings herein. In one example embodiment, the two use cases are:

building a 64-element vector that results from an element-wise MAX( ) operation across a given number of incoming vectors; and producing a single value, such as a 16-bit floating point value, representing the maximum value MAX( ) across all elements of a single vector (or portion of a vector).

Figure 1B:
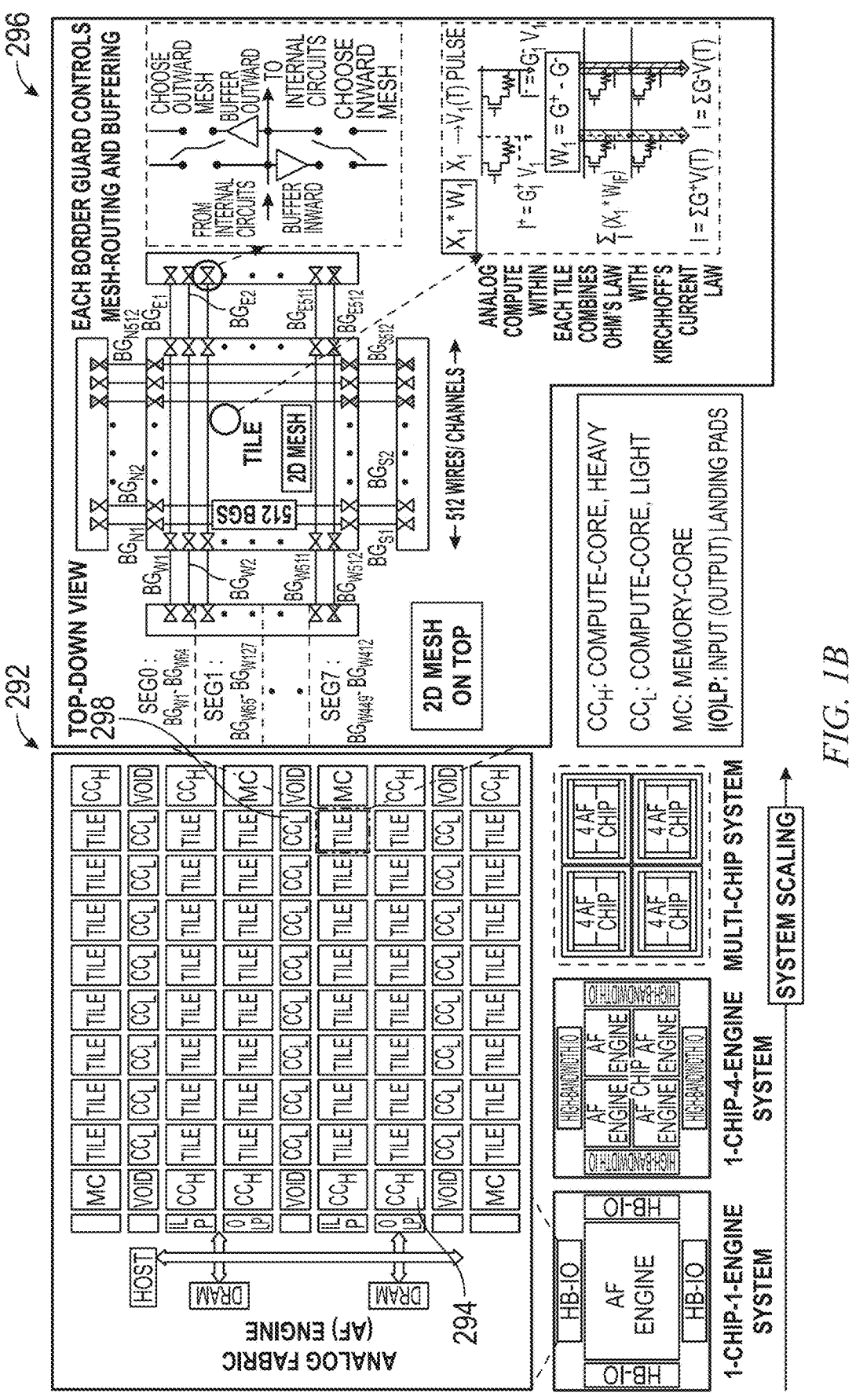
FIG. 1B is a block diagram of an example analog fabric hardware accelerator that utilizes the MAX compute circuit of FIG. 1A to perform MAX( ) operations across and/or between vectors, in accordance with an example embodiment.

FIG. 1B is a block diagram of an example analog fabric hardware accelerator architecture 292 that utilizes the MAX compute circuit 204 of FIG. 1A to perform MAX( ) operations across and/or between vectors, in accordance with an example embodiment. In one example embodiment, the hardware accelerator 292 implements a Long Short-term Memory (LSTM) network. Vectors flow from a heavy compute core 294 over vector-matrix tiles 296. Each vector-matrix tile 296 performs vector-matrix multiplication operations and passes the results to a light compute core 298 (also known as vector processing unit 298). Each light compute core 298 includes one or more MAX compute circuits 204 to perform Max( ) operations on the results of the vector-matrix multiplication operations to provide functionality for, for example, the LSTM network.

In the example embodiment of FIG. 1A, a vector (or a portion of a vector) includes 64 elements, such as 64 16-bit floating point values. Sixteen time-multiplexed sets of four elements of the vector are supplied via an input bus 210. Each of the sixteen sets is supplied in a pipelined manner; each set of four elements comprising a set is applied in parallel. Thus, elements 0-3 of the 64 element vector may be provided during a first step (such as a first clock cycle), elements 4-7 of the 64 element vector may be provided during a second step (such as a second clock cycle), and so on, until elements 60-63 of the 64 element vector are provided during a sixteenth step (such as a sixteenth clock cycle). In one example embodiment, a controller 280 is configured to control a flow of data through the MAX compute circuit 204 by controlling the components of the MAX compute circuit 204, such as the 4-wide FMAX( ) comparator 216 and the SRAM 212. (It is noted that additional instances of the MAX compute circuit 204 may be used in parallel such that a second instance of the MAX compute circuit 204 can process elements 64-127 of a 256 element vector, and so on, as described more fully below in conjunction with FIG. 3.) The controller 280 can be implemented, for example, in digital circuitry synthesized in accordance with FIG. 5 to provide control signals to cause the operational steps described herein; for example, in conjunction with voltage supplies, peripheral circuitry, etc., in a manner that will be apparent to the skilled artisan, given the teachings herein.

In one example embodiment, to build a 64-element vector that results from an element-wise MAX( ) operation across a given number of incoming vectors, each set of four 16-bit floating point (FP16) elements of the 64-element vector are processed per cycle. In the non-limiting example depicted, the first set of four FP16 elements is stored directly into a first row of a static random-access memory (SRAM) 212, the second set of four FP16 elements is stored directly into a second row of the SRAM 212, and so on, until the sixteenth set of four FP16 elements is stored directly into a sixteenth row of the SRAM 212 (generally, any suitable memory can be employed; in one or more embodiments, the memory is a dedicated local memory, which can be implemented in a number of different ways—the depicted static random-access memory is a non-limiting example).

Upon the arrival of subsequent vectors, each set of four FP16 elements of the subsequent vector is compared against the corresponding four entries stored in the SRAM 212, using a 4-wide FMAX( ) comparator 216, and the result of the comparison operation is the maximum numeric value for each of the four comparison operations of the 4-wide FMAX( ) comparator 216. The resulting four FP16 elements are then rewritten back into the appropriate row of the SRAM 212 via OUT register 220, overwriting each entry in the SRAM 212 with the updated, or not updated, data as per the MAX( ) operation. When the last vector to be compared begins arriving and is processed, then each set of four MAX( ) outputs from the 4-wide FMAX( ) comparator 216 can be stored in the SRAM 212 (as described above) or can be sent forward via the OUT register 220 in a pipelined manner for subsequent processing via output bus 244. In the latter case, the outputs of the 4-wide FMAX( ) comparator 216 can be recorded back into the SRAM 212 or the storage operation can be skipped, based on the architecture of the system utilizing the MAX compute circuit 204. For example, if the results will be consumed on-the-fly by the recipient of the results provided by the 4-wide FMAX( ) comparator 216, then the storage operation can be skipped; if the results will be needed for future processing, then the outputs of the 4-wide FMAX( ) comparator 216 can be recorded back into the SRAM 212. It is noted that, in one example embodiment, the OUT register 220 is a component of the 4-wide FMAX( ) comparator 216 (in other embodiments, these components could be separate components, as depicted). In addition, in one example embodiment, the output of the 4-wide FMAX( ) comparator 216 is connected directly to the output bus 244 and the SRAM 212.

To produce a single FP16 value representing the MAX( ) across the elements of a single vector, each set of four FP16 elements is directly input into the 4-wide FMAX( ) comparator 216 on each clock cycle. As illustrated in FIG. 1, the output of the 4-wide FMAX( ) comparator 216 of the previous MAX( ) operation is stored in the OUT register 220 and compared against the next set of four inputs arriving via the input bus 210. (For the purposes of the very first comparison, in one or more embodiments, the OUT register 220 is initialized to the scalar value representing the largest-negative FP16 value such that the first set of four FP16 elements is output by the 4-wide FMAX( ) comparator 216 and stored in the OUT register 220.) Comparisons continue across all elements of the vector, or even multiple vectors, supplied four elements at a time. After all comparisons are done, the OUT register 220 contains the maximum value for each element position of the input bus 210 received over the 16 clock cycles. A tree 248 of FMAX( ) comparators 228-1 . . . 228-N, 232 (in the example of FIG. 1, N=2) is used to compare the four entries against each other, producing the overall MAX( ) value across all the elements. In the preferred embodiment, this MAX( ) value is duplicated into the four parallel entries of the OUT register 236 in order to provide a pipelined stream of four parallel entries of the same scalar value via the output bus 244.

Figure 2:
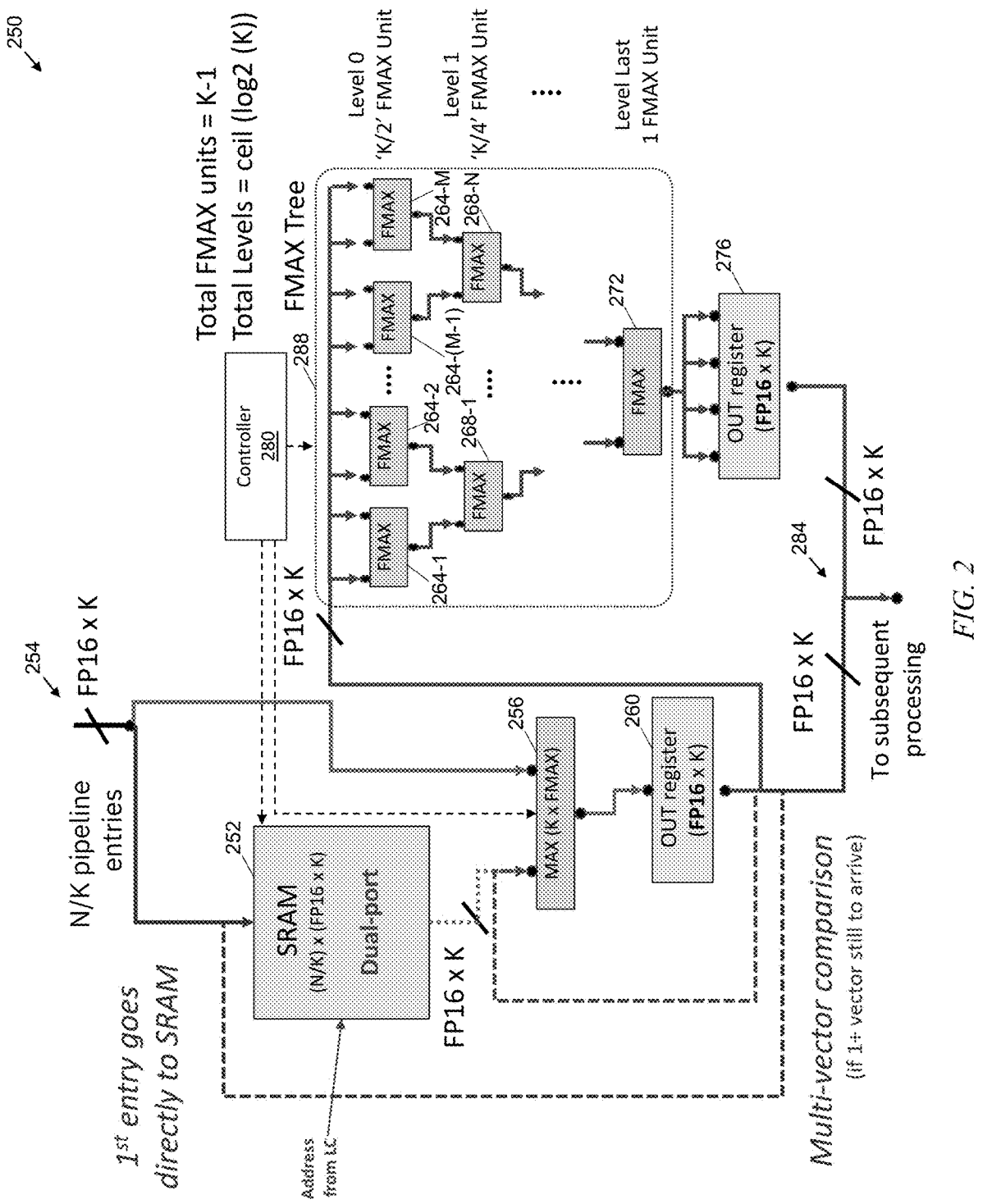
FIG. 2 is a block diagram of a second example embodiment a MAX compute circuit for performing both element-wise and cross-vector forms of the MAX( ) operation in a pipelined fashion, in accordance with an example embodiment.

FIG. 2 is a block diagram of a second example embodiment of a MAX compute circuit 250 for performing both element-wise and cross-vector forms of the MAX( ) operation in a pipelined fashion, in accordance with an example embodiment. In one or more embodiments, there are at least two use cases for the MAX compute circuit 250:

building an N-element vector that results from an element-wise MAX( ) operation across a given number of incoming vectors; and producing a single value, such as a 16-bit floating point value, representing the maximum value MAX( ) across all elements of a single vector (or portion of a vector).

In one example embodiment, to build an N-element vector that results from an element-wise MAX( ) operation across a given number of incoming vectors, each set of K elements of each N-element vector is processed per cycle in a pipeline. Multiple vectors arrive in blocks of N/K time-multiplexed steps. The first set of K FP16 elements is stored directly into a first row of a static random-access memory (SRAM) 252, the second set of K FP16 elements is stored directly into a second row of the SRAM 252, and so on, until the N/Kth set of K FP16 elements is stored directly into a N/Kth row of the SRAM 252. Upon arrival of subsequent vectors, each set of K FP16 elements is compared against the corresponding K entries stored in the SRAM 252, using a K-wide FMAX( ) comparator 256, which determines the maximum numeric value for each of the K comparison operations. The resulting K FP16 elements are then rewritten back into the appropriate row of the SRAM 252 via OUT register 260, overwriting each entry in the SRAM 252 with the updated (or not updated) data as per the MAX( ) operation. When the last vector to be compared begins arriving and is processed, then each set of K MAX( ) outputs from the K-wide FMAX( ) comparator 256 can be stored in the SRAM 252, as described above, or can be sent forward via the OUT register 260 in a pipelined manner for subsequent processing via output bus 284. In the latter case, the outputs of the K-wide FMAX( ) comparator 256 can be recorded back into the SRAM 252 or the storage operation can be skipped, based on the architecture of the system utilizing the MAX compute circuit 250. For example, if the results will be consumed on-the-fly by the recipient of the results provided by the K-wide FMAX( ) comparator 256, then the storage operation can be skipped; if the results will be needed for future processing, then the outputs of the K-wide FMAX( ) comparator 256 can be recorded back into the SRAM 252.

To produce a single value representing the MAX( ) across the elements of a single vector, each set of K FP16 elements is directly input into the K-wide FMAX( ) comparator 256 on each clock cycle. As illustrated in FIG. 2, the output of the K-wide FMAX( ) comparator 256 of the previous MAX( ) operation is compared against the next set of K inputs arriving via the input bus 254. (For the purposes of the very first comparison, in one or more embodiments, the OUT register 260 is initialized to the scalar value representing the largest-negative FP16 value.) Comparisons continue across all elements of the vector (or even multiple vectors) supplied K elements at a time. After all comparisons are done, the OUT register 260 contains the maximum value for each element position of the input bus 254 received over the N/K clock cycles. A tree 288 of FMAX( ) comparators 264-1, 264-2, . . . , 264-(M–1), 264-M; 268-1, . . . , 268-N; 272 is used to compare the K entries against each other, producing the overall MAX( ) across all the elements. In one example embodiment, this MAX( ) value is duplicated into the K parallel entries of the OUT register 276 in order to provide a pipelined stream of K parallel entries of the same scalar value, if needed, via the output bus 284. (Note: N modulo K==0, where N and K are integers.) The skilled artisan will appreciate that in the exemplary FMAX tree 288, there are K/2 FMAX units in Level 0, K/4 FMAX units in Level 1, all the way down to a single FMAX unit in the last level; generally K/2 FMAX units in the uppermost level, a single FMAX unit in the lowest level, and each level has half as many units as the level just above. Given the teachings herein, the skilled artisan can implement FMAX trees for desired configurations. In one example embodiment, at least one of a plurality of MAX compute circuits 250 is configured to compute a MAX( ) operation across all scalar values produced by the plurality of MAX compute circuits 250, producing a single scalar value representing a maximum value across all elements and across all the arriving vectors of the plurality of MAX compute circuits 250. This enables the performance of a MAX( ) operation across all elements of an arbitrarily long vector (using the plurality of MAX compute circuits 250 operating in parallel) by finding, using one of the plurality of MAX compute circuits 250, the maximum scalar of all of the single scalars produced by the plurality of MAX compute circuits 250.

In one example embodiment, rather than store the sets of K FP16 elements of the first vector directly from the input bus 254 into the static random-access memory (SRAM) 252, each set of K FP16 elements of the first vector is stored indirectly into the static random-access memory (SRAM) 252 via the K-wide FMAX( ) comparator 256 and the OUT register 260. This can be accomplished by inputting the largest negative value into the left-hand input of the K-wide FMAX( ) comparator 256 or otherwise configuring the K-wide FMAX( ) comparator 256 to compare the input from the input bus 254 to the largest negative value such that the input from the input bus 254 passes through the K-wide FMAX( ) comparator 256 for the first vector. For example, initializing the OUT register 260 with the largest negative value will ensure that the input from the input bus 254 passes through the K-wide FMAX( ) comparator 256 for the first vector Similarly, after results are ready for output, the output from the OUT register 276 may either be output directly to the output bus 284 or may be temporarily stored in the SRAM 252 before outputting the results to the output bus 284.

In one example embodiment, the dual-port SRAM 212, 252 is configured in a ping-pong manner, where a first set of rows are configured for performing the MAX( ) operations, as described above, and a second set of rows are configured to output a previously computed set of MAX( ) values to the output bus 254, 284. Once completed, the dual-port SRAM 212, 252 is configured to utilize the second set of rows for performing the MAX( ) operations, as described above, and the first set of rows to output a previously computed set of MAX( ) values to the output bus 254, 284.

Figure 3:
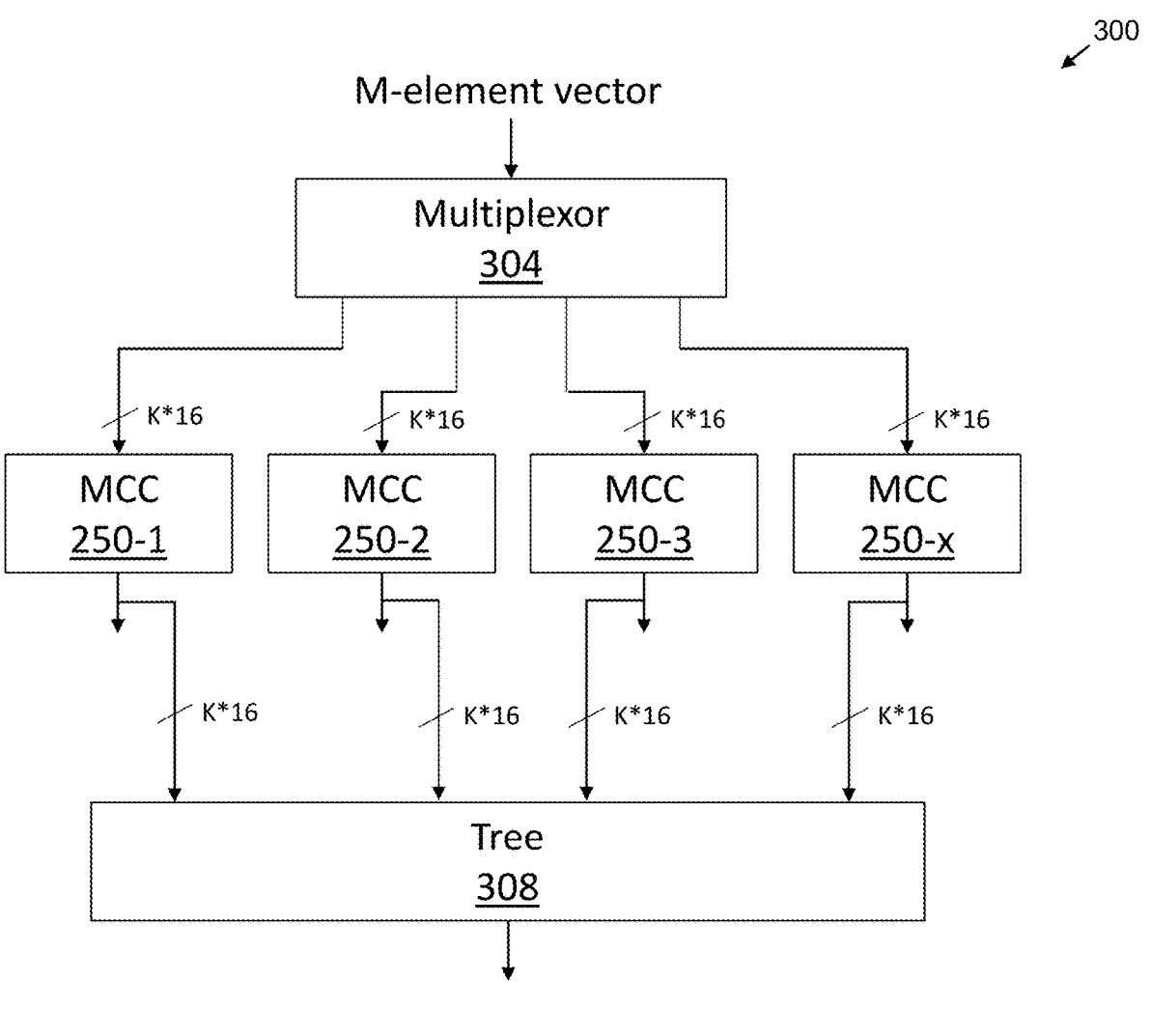
FIG. 3 is an example system for performing both element-wise and cross-vector forms of the MAX( ) operation in a pipelined fashion, in accordance with an example embodiment.

FIG. 3 is an example system 300 for performing both element-wise and cross-vector forms of the MAX( ) operation in a pipelined fashion, in accordance with an example embodiment. In one example embodiment, x instances of the MAX compute circuit (MCC) 250-1, 250-2, 250-3, . . . , 250-x are configured in parallel. A multiplexor device 304 inputs a vector that includes M elements, such as M FP16 values. M/x of the elements of the vector are output to each corresponding MAX compute circuit (MCC) 250-1, 250-2, 250-3, . . . , 250-x. For example, elements 0 through $(M/x-1)$ may be output to instance 250-1, elements $(M/x)$ through $(2M/x-1)$ may be output to instance 250-2, and so on, such that each instance of the MAX compute circuits (MCC) 250-1, 250-2, 250-3, 250-x processes a portion of the vector. In addition, the multiplexor 304 time multiplexes the output destined for each instance of the MAX compute circuits (MCC) 250-1, 250-2, 250-3, . . . , 250-x, as described above in conjunction with FIG. 2, such that K elements are delivered on each clock cycle to each instance. To build the M-element vector that results from an element-wise MAX( ) operation across a given number of incoming vectors, the outputs of each instance are appended together into a single M-element vector. To produce a single value representing the MAX( ) across the elements of the single M-element vector, a tree 308 (similar to tree 248) is constructed to input the value computed by each instance of the MAX compute circuits (MCC) 250-1, 250-2, 250-3, . . . , 250-x and to output the maximum value of all of the results generated by the MAX compute circuits (MCC) 250-1, 250-2, 250-3, . . . , 250-x.

Given the discussion thus far, it will be appreciated that, in general terms, an exemplary system, according to an aspect of the invention, includes an input bus 210, 254; an output bus 284; a memory 212, 252 configured to store N/K elements of an N-element vector in a corresponding row of the memory 212, 252, the memory having a read port and a write port; a K-wide FMAX( ) comparator 216, 256, the K-wide FMAX( ) comparator having a first set of K-wide inputs coupled to the read port of the memory 212, 252 and a second set of K-wide inputs coupled to the input bus 210, 254, the K-wide FMAX( ) comparator having a set of K-wide outputs coupled to the write port of the memory 212, 252; and a tree 288 of FMAX( ) comparators 264-1, 264-2, . . . , 264-(M–1), 264-M, 268-1, . . . , 268-N, 272, the tree 288 having an input and an output, the input of the tree 288 being coupled to the set of K-wide outputs of the K-wide FMAX( ) comparator 256 and the output of the tree 288 being coupled to the output bus 284.

In one example embodiment, the system includes an OUT register 260, an input of the OUT register 260 coupled to the set of K-wide outputs of the K-wide FMAX( ) comparator 256 and an output of the OUT register 260 coupled to the write port of the memory 212, 252.

In one example embodiment, the system includes a controller 280 configured to initialize the OUT register 220, 260, for an initial comparison operation, to a scalar value representing a largest-negative value capable of being stored in the OUT register 220, 260.

In one example embodiment, the system includes an OUT register 276, an input of the OUT register 276 coupled to the output of the tree 288 and an output of the OUT register 276 coupled to the output bus 284.

In one example embodiment, the memory is a dedicated local memory. In one example embodiment, the dedicated local memory is implemented as a static random-access memory.

In one aspect, a system includes a memory 212, 252 having a read port and a write port; an interconnection network; a plurality of MAX compute circuits 250 coupled to the interconnection network, each MAX compute circuit 250 assigned a corresponding portion of each of a plurality of arriving vectors, wherein each MAX compute circuit 250 is configured to receive the corresponding portion of each arriving vector as a time-multiplexed set of sequences of elements, store each of the sequence of elements in a row of the memory 212, 252, perform a parallel MAX( ) operation between a subsequent sequence of elements and a corresponding sequence of elements stored within the memory 212, 252 for a corresponding point in the time-multiplexed set, store a resulting sequence of elements into the memory 212, 252, and output a final resulting sequence of elements from the memory 212, 252.

In one example embodiment, the final resulting sequence of elements comprises an element-wise MAX( ) vector across the plurality of arriving vectors.

In one example embodiment, each MAX compute circuit 250 comprises a controller 280 configured to control a flow of data through the corresponding MAX compute circuit; an input bus 210, 254; an output bus 284; a K-wide FMAX( ) comparator 216, 256, a first set of K-wide inputs of the K-wide FMAX( ) comparator 216, 256 coupled to the read port of the memory 212, 252 and a second set of K-wide inputs of the K-wide FMAX( ) comparator 216, 256 coupled to the input bus 210, 254, and a set of K-wide outputs of the K-wide FMAX( ) comparator 216, 256 coupled to the write port of the memory 212, 252; and a tree 288 of FMAX( ) comparators 264-1, 264-2, . . . , 264-(M–1), 264-M, 268-1, . . . , 268-N, 272, the tree 288 comprising an input and an output, the input of the tree 288 coupled to the set of K-wide outputs of the K-wide FMAX( ) comparator 256 and the output of the tree 288 coupled to the output bus 284, wherein the memory 212, 252 is configured to store N/K elements of an N-element vector in a corresponding row of the memory 212, 252.

In one aspect, a system (e.g., a hardware accelerator system 202) includes an interconnection network; an OUT register 260 comprising an output; a plurality of MAX compute circuits 250 coupled to the interconnection network, each MAX compute circuit 250 assigned a corresponding portion of each of one or more arriving vectors, wherein each MAX compute circuit 250 is configured to receive the corresponding portion of each arriving vector as a time-multiplexed set of sequences of elements, reset the OUT register 260, perform a parallel MAX( ) operation between a subsequent sequence of elements and the output of the OUT register 260 and store a resulting vector in the OUT register 260 in response to receiving the subsequent sequence of elements, perform MAX( ) operations across elements within the OUT register 260, and produce a scalar value representing a maximum value across the corresponding portion of all arriving vectors associated with a corresponding one of the plurality of MAX compute circuits 250.

In one example embodiment, at least one of the plurality of MAX compute circuits 250 is configured to compute a MAX( ) operation across all scalar values produced by the plurality of MAX compute circuits 250, producing a single scalar value representing a maximum across all elements and across all the arriving vectors of the plurality of MAX compute circuits 250.

In one example embodiment, the system further comprises a plurality of heavy compute cores 294; a plurality of light compute cores 298, with each light compute core 298 configured to utilize one or more of the plurality of MAX compute circuits to perform the MAX( ) operations; and a plurality of vector-matrix tiles 296 configured to receive vectors from corresponding heavy compute cores 294, perform vector-matrix multiplication operations, and pass computation results to the light compute core 298.

Figure 5:
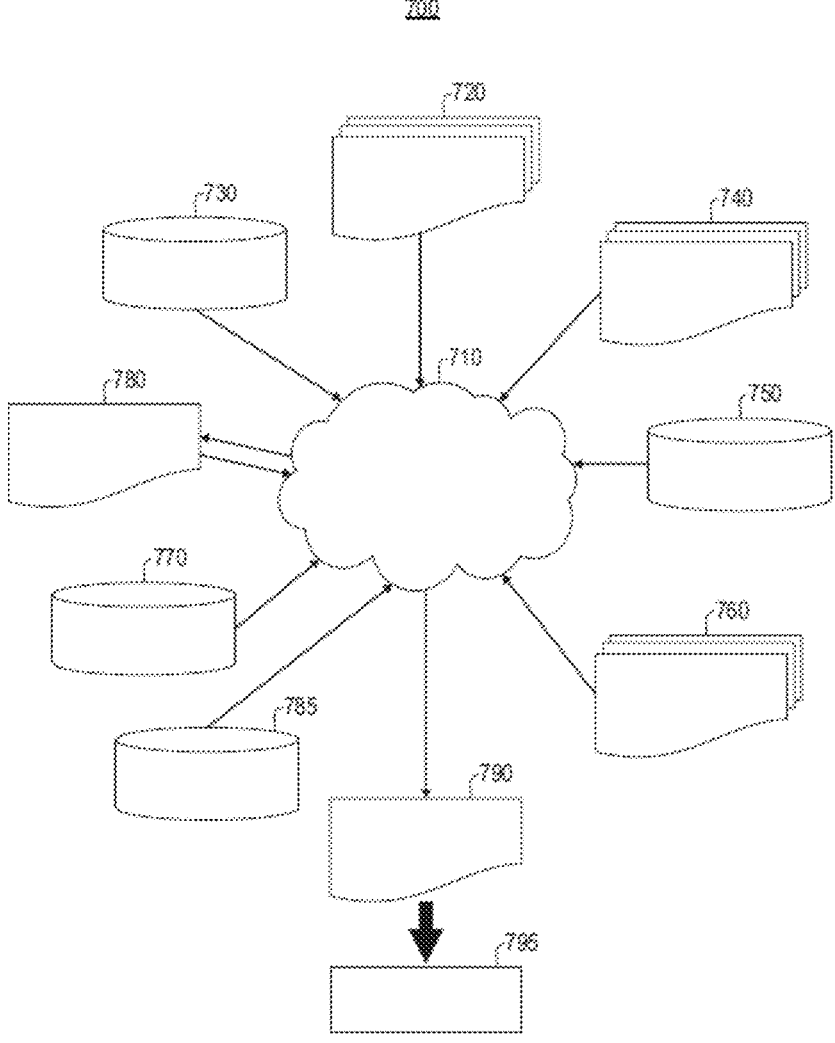
FIG. 5 is a flow diagram of a design process used in semiconductor design, manufacture, and/or test.

Reference should now be had to FIG. 4, which depicts a computing environment according to an embodiment of the present invention (e.g., for implementing a design process such as that of FIG. 5, also generally representative of a conventional, Von Neumann computing environment that could be modified to employ a hardware accelerator in accordance with aspects of the invention). A hardware accelerator 202 (hardware coprocessor) uses the specialized hardware techniques disclosed herein to accelerate multiply accumulate operations for neural networks, or the like. The elements 202 and 120 can connect to a suitable bus, for example, with suitable bus interface units.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a system 200 for semiconductor design and/or control of semiconductor fabrication (see FIG. 5, also, as noted, generally representative of a conventional, Von Neumann computing environment that could be modified to employ a hardware accelerator 202 in accordance with aspects of the invention). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. In one example embodiment, one or more MAX compute circuits 250 are integrated into a hardware accelerator 202 of the computer 100. As described above, the hardware accelerator 202 may be deployed to implement, for example, a Long Short-term Memory (LSTM) network.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Exemplary Design Process Used in Semiconductor Design, Manufacture, and/or Test

One or more embodiments make use of computer-aided semiconductor integrated circuit design simulation, test, layout, and/or manufacture. In this regard, FIG. 5 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The illustrations of embodiments described herein are intended to provide a general understanding of the various embodiments, and they are not intended to serve as a complete description of all the elements and features of apparatus and systems that might make use of the circuits and techniques described herein. Many other embodiments will become apparent to those skilled in the art given the teachings herein; other embodiments are utilized and derived therefrom, such that structural and logical substitutions and changes can be made without departing from the scope of this disclosure. It should also be noted that, in some alternative implementations, some of the steps of the exemplary methods may occur out of the order noted in the figures. For example, two steps shown in succession may, in fact, be executed substantially concurrently, or certain steps may sometimes be executed in the reverse order, depending upon the functionality involved. The drawings are also merely representational and are not drawn to scale. Accordingly, the specification and drawings are to be regarded in an illustrative rather than a restrictive sense.

Embodiments are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Terms such as "bottom", "top", "above", "over", "under" and "below" are used to indicate relative positioning of elements or structures to each other as opposed to relative elevation. If a layer of a structure is described herein as "over" another layer, it will be understood that there may or may not be intermediate elements or layers between the two specified layers. If a layer is described as "directly on" another layer, direct contact of the two layers is indicated. As the term is used herein and in the appended claims, "about" means within plus or minus ten percent.

The corresponding structures, materials, acts, and equivalents of any means or step-plus-function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit thereof. The embodiments were chosen and described in order to best explain principles and practical applications, and to enable others of ordinary skill in the art to understand the various embodiments with various modifications as are suited to the particular use contemplated.

The abstract is provided to comply with 37 C.F.R. § 1.76 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, the claimed subject matter may lie in less than all features of a single embodiment. Thus, the following claims are hereby incorporated into the Detailed Description, with each claim standing on its own as separately claimed subject matter.

Given the teachings provided herein, one of ordinary skill in the art will be able to contemplate other implementations and applications of the techniques and disclosed embodiments. Although illustrative embodiments have been described herein with reference to the accompanying drawings, it is to be understood that illustrative embodiments are not limited to those precise embodiments, and that various other changes and modifications are made therein by one skilled in the art without departing from the scope of the appended claims.

What is claimed is:

1. An apparatus comprising:
an input bus;
an output bus;
a memory configured to store K elements of an N-element vector in a corresponding row of the memory, the memory having a read port and a write port;
a K-wide FMAX( ) comparator, the K-wide FMAX( ) comparator having a first set of K-wide inputs coupled to the read port of the memory and a second set of K-wide inputs coupled to the input bus, the K-wide FMAX( ) comparator having a set of K-wide outputs coupled to the write port of the memory; and a tree of FMAX( ) comparators, the tree having an input and an output, the input of the tree being coupled to the set of K-wide outputs of the K-wide FMAX( ) comparator and the output of the tree being coupled to the output bus.

2. The apparatus of claim 1, further comprising an OUT register, an input of the OUT register coupled to the set of K-wide outputs of the K-wide FMAX( ) comparator and an output of the OUT register coupled to the write port of the memory.

3. The apparatus of claim 2, further comprising a controller coupled to the OUT register and configured to initialize the OUT register, for an initial comparison operation, to a scalar value representing a largest-negative value capable of being stored in the OUT register.

4. The apparatus of claim 1, further comprising an OUT register, an input of the OUT register coupled to the output of the tree and an output of the OUT register coupled to the output bus.

5. The apparatus of claim 1, wherein the memory is a dedicated local memory.

6. The apparatus of claim 5, wherein the dedicated local-memory is a static random-access memory.

7. A system comprising:
a memory having a read port and a write port;
an interconnection network; and
a plurality of MAX compute circuits coupled to the interconnection network, each MAX compute circuit assigned a corresponding portion of each of a plurality of arriving vectors;
wherein each MAX compute circuit is configured to:
receive the corresponding portion of each arriving vector as a time-multiplexed set of sequences of elements,
store each of the sequence of elements in a row of the memory,
perform a parallel MAX( ) operation between a subsequent sequence of elements and a corresponding sequence of elements stored within the memory for a corresponding point in the time-multiplexed set,
store a resulting sequence of elements into the memory, and
output a final resulting sequence of elements from the memory;
wherein each MAX compute circuit comprises:
a controller configured to control a flow of data through the corresponding MAX compute circuit;
an input bus;
an output bus;
a K-wide FMAX( ) comparator, a first set of K-wide inputs of the K-wide FMAX( ) comparator coupled to the read port of the memory and a second set of K-wide inputs of the K-wide FMAX( ) comparator coupled to the input bus, and a set of K-wide outputs of the K-wide FMAX( ) comparator coupled to the write port of the memory; and
a tree of FMAX( ) comparators, the tree comprising an input and an output, the input of the tree coupled to the set of K-wide outputs of the K-wide FMAX( ) comparator and the output of the tree coupled to the output bus, wherein the memory is configured to store N/K elements of an N-element vector in a corresponding row of the memory.

8. The system of claim 7, each MAX compute circuit further comprising an OUT register, an input of the OUT register coupled to the set of K-wide outputs of the K-wide FMAX( ) comparator and an output of the OUT register coupled to the write port of the memory.

9. The system of claim 8, wherein a controller is configured to initialize the OUT register, for an initial comparison operation, to a scalar value representing a largest-negative value capable of being stored in the OUT register.

10. The system of claim 7, each MAX compute circuit further comprising an OUT register, an input of the OUT register coupled to the output of the tree and an output of the OUT register coupled to the output bus.

11. A system comprising:

an interconnection network;

an OUT register comprising an output;

a plurality of MAX compute circuits coupled to the interconnection network, each MAX compute circuit assigned a corresponding portion of each of one or more arriving vectors;

wherein each MAX compute circuit is configured to:

receive the corresponding portion of each arriving vector as a time-multiplexed set of sequences of elements, reset the OUT register, perform a parallel MAX( ) operation between a subsequent sequence of elements and an output of the OUT register and store a resulting vector in the OUT register in response to receiving the subsequent sequence of elements, perform MAX( ) operations across elements within the OUT register, and produce a scalar value representing a maximum value across the corresponding portion of all arriving vectors associated with a corresponding one of the plurality of MAX compute circuits;

wherein each MAX compute circuit comprises:

an input bus;

an output bus;

a K-wide FMAX( ) comparator, a first set of K-wide inputs of the K-wide FMAX( ) comparator coupled to a read port of the memory and a second set of K-wide inputs of the K-wide FMAX( ) comparator coupled to the input bus, and a set of K-wide outputs of the K-wide FMAX( ) comparator coupled to a write port of the memory; and a tree of FMAX( ) comparators, the tree comprising an input and an output, the input of the tree coupled to the set of K-wide outputs of the K-wide FMAX( ) comparator and the output of the tree coupled to the output bus, wherein the memory is configured to store N/K elements of an N-element vector in a corresponding row of the memory.

12. The system of claim 11, each MAX compute circuit further comprising an OUT register, an input of the OUT register coupled to the set of K-wide outputs of the K-wide FMAX( ) comparator and an output of the OUT register coupled to the write port of the memory.

13. The system of claim 12, wherein a controller is configured to initialize the OUT register, for an initial comparison operation, to a scalar value representing a largest-negative value capable of being stored in the OUT register.

14. The system of claim 11, each MAX compute circuit further comprising an OUT register, an input of the OUT register coupled to the output of the tree and an output of the OUT register coupled to the output bus.

* * * * *